United States Patent
Lee et al.

(10) Patent No.: US 9,246,562 B2
(45) Date of Patent: Jan. 26, 2016

(54) APPARATUS AND METHOD FOR TRANSMITTING/RECEIVING DATA IN COMMUNICATION SYSTEM

(75) Inventors: Jae-Seung Lee, Daejeon (KR); Sok-Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 46 days.

(21) Appl. No.: 13/336,859

(22) Filed: Dec. 23, 2011

(65) Prior Publication Data
US 2012/0188925 A1    Jul. 26, 2012

(30) Foreign Application Priority Data

Dec. 23, 2010 (KR) .................. 10-2010-0133882
Dec. 22, 2011 (KR) .................. 10-2011-0140073

(51) Int. Cl.
| | | |
|---|---|---|
| G08C 17/00 | (2006.01) | |
| H04B 7/04 | (2006.01) | |
| H04W 52/02 | (2009.01) | |
| H04W 28/14 | (2009.01) | |

(52) U.S. Cl.
CPC ......... *H04B 7/0452* (2013.01); *H04W 52/0216* (2013.01); *H04W 52/0235* (2013.01); *H04W 28/14* (2013.01); *Y02B 60/50* (2013.01)

(58) Field of Classification Search
CPC .............. H04W 52/0235; H04W 52/0216; H04B 7/0452
USPC .......................... 455/574; 370/311
See application file for complete search history.

(56) References Cited

U.S. PATENT DOCUMENTS

| | | | |
|---|---|---|---|
| 7,796,545 B2 * | 9/2010 | Surineni ........... | H04W 52/0225 370/252 |
| 2007/0104162 A1 * | 5/2007 | Kneckt et al. ................. | 370/338 |
| 2007/0230418 A1 | 10/2007 | Takeuchi et al. | |
| 2007/0281617 A1 | 12/2007 | Meylan et al. | |

(Continued)

FOREIGN PATENT DOCUMENTS

| | | |
|---|---|---|
| EP | 1 953 969 A2 | 8/2008 |
| KR | 1020090030295 A | 3/2009 |

OTHER PUBLICATIONS

Xavier Perez-Costa et al., "AU-APSD: Adaptive IEEE 802.11e Unscheduled Automatic Power Save Delivery", IEEE ICC, 2006, p. 2020-2027, IEEE.

*Primary Examiner* — Marcus R Smith
*Assistant Examiner* — Syed S Ali

(57) ABSTRACT

Disclosed are an apparatus and a method for transmitting/receiving data while providing power saving efficiency of a terminal, for example, a station (hereinafter, referred to as 'STAS) in a communication system providing services to multi users in a multi-input multi-output (hereinafter, referred to as 'MIMO') scheme. The apparatus for transmitting data includes: a receiving unit configured to receive an uplink frame from a plurality of terminals by a multi user-multiple-input multiple-output (MIMO) scheme; a generating unit configured to generate a packet including support information on a multi user-power saving scheme with the terminals; a buffering unit configured to buffer data corresponding to the terminals; and a transmitting unit configured to transmit a downlink frame including the generated packet and the buffered data to the terminals by the multi user-MIMO scheme.

16 Claims, 13 Drawing Sheets

(56) References Cited

U.S. PATENT DOCUMENTS

| | | | |
|---|---|---|---|
| 2008/0130538 A1* | 6/2008 | Raissinia | H04W 28/06 370/310 |
| 2008/0225756 A1 | 9/2008 | Amann et al. | |
| 2009/0093281 A1* | 4/2009 | Demirhan et al. | 455/574 |
| 2009/0124301 A1* | 5/2009 | Raissinia | H04W 52/0216 455/574 |
| 2011/0199996 A1* | 8/2011 | Zhang et al. | 370/329 |
| 2011/0228728 A1* | 9/2011 | Baligh et al. | 370/328 |
| 2011/0268094 A1* | 11/2011 | Gong | H04L 1/1685 370/338 |
| 2011/0281581 A1* | 11/2011 | Brandt et al. | 455/427 |
| 2012/0014245 A1* | 1/2012 | Park et al. | 370/216 |
| 2012/0044925 A1* | 2/2012 | Lee | H04L 27/2602 370/338 |
| 2012/0051240 A1* | 3/2012 | Dwivedi | H04W 76/023 370/252 |
| 2012/0071101 A1* | 3/2012 | Wentink | H04W 72/1215 455/63.1 |
| 2013/0142097 A1* | 6/2013 | Gong et al. | 370/311 |
| 2013/0177010 A9* | 7/2013 | Vijayan et al. | 370/345 |
| 2013/0182685 A1* | 7/2013 | Yu et al. | 370/336 |

* cited by examiner

FIG. 6

| bits | B0 | B1 | B2 | B3 | B4 | B5 | B6 | B7 | B8 | B9 | B10 | B11 | B12 | B13 | B14 | B15 |
|---|---|---|---|---|---|---|---|---|---|---|---|---|---|---|---|---|
| sub field | ESS | IBSS | CF-Pollable | CF-Poll Request | Privacy | Short Preamble | PBCC | Channel Agility | Spectrum Management | Qos | Short Slot Time | APSD | Reserved | DSSS-OFDM | Delayed Block Ack | Immediate Block Ack |
| 602 | 604 | 606 | 608 | 610 | 612 | 614 | 616 | 618 | 620 | 622 | 624 | 626 | 628 | 630 | 632 | 634 |

FIG. 7

| sub field | PCO | PCO Transition Time | Reserved | MCS feedback | +HTC Support | RD responder | Reserved |
|---|---|---|---|---|---|---|---|
| bits | B0 | B1-B2 | B3-B7 | B8-B9 | B10 | B11 | B12-B15 |
| 702 | 704 | 706 | 708 | 710 | 712 | 714 | 716 |

FIG. 8

| bits | B0 | B1-B2 | B3-B7 | B8-B9 | B10 | B11 | B12-B15 |
|---|---|---|---|---|---|---|---|
| sub field | PCO | PCO Transition Time | Reserved | MCS feedback | +HTC Support | RD responder | Reserved |
| | 804 | 806 | 808 | 810 | 812 | 814 | 816 |

802

| B12 | B13 | B14 | B15 |
|---|---|---|---|
| AC_VO MU_APSD Flag | AC_VI MU_APSD Flag | AC_BK MU_APSD Flag | AC_BE MU_APSD Flag |
| 818 | 820 | 822 | 824 |

FIG. 9

| bits | B0 | B1-B4 | B5-B6 | B7-B8 | B9 | B10 | B11-B13 | B14-B15 | B16 | B17-B23 |
|---|---|---|---|---|---|---|---|---|---|---|
| sub field | Traffic Type | TSID | Direction | Access Policy | Aggrer gation | APSD | User Priornity | TSinfo Ack Policy | Schedule | Reserved |
| 902 | 904 | 906 | 908 | 910 | 912 | 914 | 916 | 918 | 920 | 922 |

APPARATUS AND METHOD FOR TRANSMITTING/RECEIVING DATA IN COMMUNICATION SYSTEM

CROSS-REFERENCES TO RELATED APPLICATIONS

The present application claims priority of Korean Patent Application Nos. 10-2010-0133882 and 10-2011-0140073, filed on Dec. 23, 2010, and Dec. 22, 2011, respectively, which are incorporated herein by reference in their entirety.

BACKGROUND OF THE INVENTION

1. Field of the Invention

Exemplary embodiments of the present invention relate to a communication system, and more particularly, to an apparatus and a method for transmitting/receiving data while providing power saving efficiency of a terminal, for example, a station (hereinafter, referred to as 'STA') in a communication system providing services to multi users in a multi-input multi-output (hereinafter, referred to as 'MIMO') scheme.

2. Description of Related Art

In a current communication system, research for providing services having various quality of services (hereinafter, referred to as 'QoS') to users at a high transmission rate has been actively conducted. As an example of the communication system, in a wireless local area network (hereinafter, referred to as 'WLAN') system, research into methods for stably transmitting large-capacity data at high rate through limited resources has been actively conducted. In particular, in a communication system, research into data transmission through a wireless channel has been conducted. Recently, methods for allowing the WLAN system to normally transmit and receive large-capacity data by effectively using a limited wireless channel have been proposed.

Meanwhile, in the communication system, research into methods for minimizing power consumption, in particular, maximizing power saving efficiency of the terminal, that is, the STA while transmitting/receiving large-capacity data through a wireless channel has been actively conducted. In particular, in the WLAN system, research into methods for maximizing power saving efficiency so as to minimize power consumption of the system while improving throughput so as to transmit/receive large-capacity data has been conducted.

However, as described above, in the current communication system, for example, the WLAN system, detailed methods for maximizing power saving efficiency of the system while improving throughput so as to normally transmit/receive large-capacity data through a limited channel have not yet been proposed. In particular, when services are provided to multi users by an MIMO scheme in the WLAN system, detailed methods for normally transmitting/receiving large-capacity data while maximizing power saving efficiency and improving throughput of the WLAN system, in particular, the terminal, that is, the STA have not yet been proposed.

Therefore, in the communication system, for example, the WLAN system, a need exists for a method for transmitting/receiving data by maximizing power saving efficiency of the WLAN system while improving throughput so as to stably transmit/receive large-capacity data at a high rate through limited resources.

SUMMARY OF THE INVENTION

An embodiment of the present invention is directed to an apparatus and a method for transmitting/receiving data in a communication system.

In addition, another embodiment of the present invention is directed to an apparatus and a method for stably transmitting/receiving large-capacity data at a high rate by improving throughput and maximizing power saving efficiency of a system through limited resources in a communication system providing services to the multi users by an MIMO scheme.

In addition, another embodiment of the present invention is directed to an apparatus and a method for stably transmitting/receiving large-capacity data at a high rate by maximizing STAs by various power saving schemes in a communication system providing services to multi users by an MIMO scheme.

In accordance with an embodiment of the present invention, an apparatus for transmitting data in a communication system includes: a receiving unit configured to receive an uplink frame from a plurality of terminals by a multi user-multiple-input multiple-output (MIMO) scheme; a generating unit configured to generate a packet including support information on a multi user-power saving scheme with the terminals; a buffering unit configured to buffer data corresponding to the terminals; and a transmitting unit configured to transmit a downlink frame including the generated packet and the buffered data to the terminals by the multi user-MIMO scheme.

In accordance with another embodiment of the present invention, an apparatus for receiving data includes: a transmitting unit configured to transmit an uplink frame requesting buffered data to an access point (AP) and transmit the requested uplink frame to the access point by a multi user-multi-input multi-output (MIMO) scheme; a receiving unit configured to receive a downlink frame including the buffered data and support information on the multi user-power saving scheme from the access point by the multi user-MIMO scheme; and a control unit configured to control state shifting between a sleep mode and a wake up mode according to the multi user-power saving scheme.

In accordance with a still another embodiment of the present invention, a method for transmitting data in a communication system includes: receiving an uplink frame from a plurality of terminals by a multi user-multiple-input multiple-output (MIMO) scheme; generating a packet including support information on a multi user-power saving scheme controlling state shifting between a sleep mode and a wake up mode of the terminals; transmitting a downlink frame including the generated packet and the buffered data to the terminals by the multi user-MIMO scheme.

BRIEF DESCRIPTION OF THE DRAWINGS

FIGS. 6 to 9 are diagrams schematically illustrating a data packet structure in the communication system in accordance with an embodiment of the present invention.

DESCRIPTION OF SPECIFIC EMBODIMENTS

Figure 1:
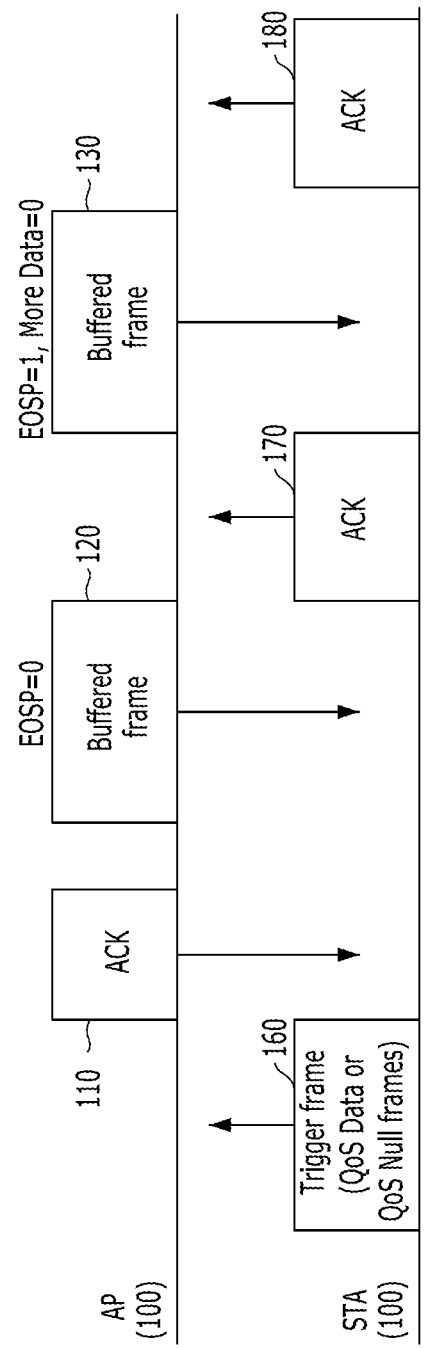
FIGS. 1 to 5 and FIG. 10 are diagrams schematically illustrating a process of transmitting/receiving data in a communication system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

An embodiment of the present invention proposes an apparatus and a method for transmitting/receiving data in a communication system, for example, a wireless local area network (hereinafter, referred to as "WLAN") system. Herein, even though the embodiment of the present invention describes an example of the WLAN system, a method for transmitting/receiving data proposed in the embodiment of the present invention may be applied to other communication systems.

In addition, embodiments of the present invention propose an apparatus and a method for transmitting/receiving data by providing power saving efficiency of a terminal, for example, a station (hereinafter, referred to as 'STAS) in a communication system providing services to multi users in a multi-input multi-output (hereinafter, referred to as 'MIMO') scheme. Meanwhile, in the embodiments of the present invention, the communication system, for example, an IEEE 802.11 WLAN system will be described by way of example. Herein, when the WLAN system provides services to multi users by the MIMO scheme, the IEEE 802.11 WLAN system maximizes power saving efficiency of STAs and improves throughput, thereby normally transmitting/receiving large-capacity data.

In this case, the embodiments of the present invention maximize the power saving efficiency of the system, in particular, the STAs by various power saving schemes. In this case, according to the embodiments of the present invention, the WLAN system uses a legacy power saving scheme using a power saving-poll frame (PS-poll frame), an automatic power save delivery (hereinafter, referred to as 'APSD') scheme, a power save multi poll (hereinafter, referred to as 'PSMP'), and the like, as various power saving schemes to maximize the power saving efficiency of the STAs.

Describing in more detail, in the legacy power saving scheme, when an access point (hereinafter, referred to as an 'AP') receives data to be transmitted to the STA that is in a sleep mode state, the WLAN system in accordance with the embodiments of the present invention allows the AP to buffer the received data and the AP to inform the STA for each beacon period, for example, each 100 ms whether the data buffered in the AP for a specific STA are present. In this case, the STAs listen to the beacons by being shifted to a wake up mode state within a predetermined period and then, transmit the PS-poll frame to the AP and receive the corresponding data buffered in the AP when the data corresponding to the STAs among the data buffered in the AP are present in the AP. In the legacy power saving scheme, as the STA confirms the corresponding data buffered in the AP within the beacon period, downlink delay occurs. Therefore, the legacy power saving scheme has a limitation when services sensitive to quality of service (hereinafter, referred to as 'QoS') such as VoIP, and the like, are provided.

Further, in order to overcome the limitation of the legacy power saving scheme, the APSD scheme is appropriate for a case of providing services sensitive to the QoS, since in the WLAN system in accordance with the embodiments of the present invention, the STAs are in a wake up mode state for a service period and the STAs can receive the corresponding data buffered in the AP more frequently than the beacon period. In this case, the APSD scheme includes a scheduled-APSD (hereinafter, referred to as a 's-APSD') scheme and an unscheduled-APSD (hereinafter, referred to as a 'u-APSD') scheme. Further, the WLAN system in accordance with the embodiments of the present invention can improve channel use efficiency and power saving efficiency in the APSD that is the scheduled and unscheduled based power saving schemes, in particular, the u-APSD scheme that is the unscheduled scheme.

The embodiments of the present invention can improve throughput and power saving efficiency by using various power saving schemes as described above, in particular, the u-APSD scheme. In addition, the embodiments of the present invention can improve data transmission efficiency and the power saving efficiency of the system in large-capacity applications and traffic communication environment that demands high throughput such as video conference by the u-APSD scheme. Further, in the communication system according to the embodiments of the present invention, a method for transmitting/receiving data using the u-APSD scheme will be described in more detail.

FIG. 1 is a diagram schematically illustrating a process for transmitting/receiving data in a communication system in accordance with an embodiment of the present invention. Herein, FIG. 1 is a diagram schematically showing a flow of transmitting/receiving data by providing power saving efficiency of an STA by a u-APSD scheme, in a communication system, for example, a WLAN system, in accordance with an embodiment of the present invention.

Referring to FIG. 1, in the WLAN system, an STA 150 shifts a sleep mode state to a wake up mode state and then, transmits a trigger frame 160 to an AP 100. In this case, as the AP 100 receives the trigger frame 160 from the STA 150, an unscheduled service period as a service period starts. Herein, each AC of the STA 150 is designated as trigger/delivery-enabled and the STA 150 is shifted to the wake up mode state to transmit a QoS data frame or a QoS null frame as the trigger frame 160. Further, the QoS null frame is transmitted so as to request the corresponding data buffered in the AP 100 to the AP 100 even though uplink data to be transmitted to the AP 100 by the STA 150 are not present.

In addition, the AP 100 receiving the trigger frame 160 transmits an ACK 110 as the acknowledgement of reception of the trigger frame 160 to the STA 150. Further, the AP 100 transmits buffered frames 120 and 130 of data to the corresponding STA 150 when the buffered data correspond to the delivery-enabled AC. In addition, the STA 150 receiving the buffered frames 120 and 130 transmits ACKs 170 and 180 as the acknowledgement of reception of the buffered frames 120 and 130 to the AP 100.

In this case, the AP 100 transmits a medium access control (MAC) service data unit (MSDU) or aggregated MSDU (A-MSDU) as the buffered frames 120 and 130 to the STA 150 in the service period, wherein the MSDU or A-MSDU is less than figures designated in a max service period (SP) length field. Further, the buffered frames 120 and 130 include an end of service period (EOSP) informing that the service period ends and when the buffered frame is continuously transmitted due to the presence of the buffered data in the AP 100, that is, when the service period is continued, the EOSP is set to be '0' and when the service period ends, the EOSP is set to be '1'. In this case, when all the buffered data are not transmitted in the service period, that is, when the service period ends (EOSP=1), but when the non-transmitted buffered data are present in the AP, More Data informing whether the buffered data are present is set to be '1'. Further, when all the buffered data are transmitted and thus, no data are present, the More Data is set to be '0'.

Herein, the service period becomes from a time after the trigger frame 160 is received to a time when the buffered frame 130 of which the EOSP is set to be '1' is received and thus, the ACK 180 for the buffered frame 130 of which the EOSP is set to be '1' is transmitted. As described above, when the EOSP is set to be '1' and the service period ends but the More Data is set to be '1', and thus, the non-transmitted buffered data are present in the AP, the non-transmitted buffered data are transmitted in the next new service period. As such, when the service period ends and all the buffered data are transmitted, the STA 150 receives the buffered frame of which the EOSP is set to be '1' and the More data is set to be '0' and transmits the ACK 180 and then, is shifted from the wake up mode state to the sleep mode state, such that the power saving efficiency of the STA 150 is maximized. Herein, referring to FIG. 2, when the communication system in accordance with the embodiment of the present invention provides services to the multi users, that is, when the large-capacity traffic is present, the transmission/reception of data using the u-APSD scheme will be described in more detail.

Figure 2:
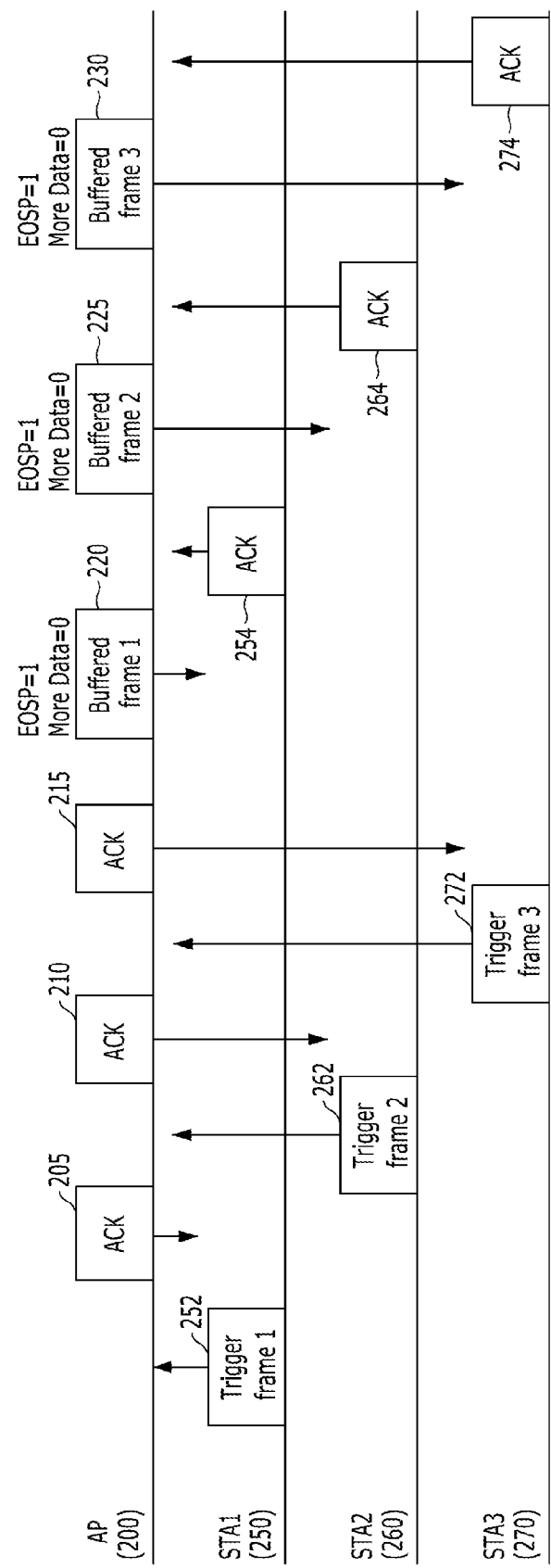

FIG. 2 is a diagram schematically illustrating a process for transmitting/receiving data in a communication system in accordance with another embodiment of the present invention. Herein, FIG. 2 is a diagram schematically showing a flow of transmitting/receiving data by providing power saving efficiency of an STA by a u-APSD scheme when the large-capacity traffic corresponding to the multi users are present, in the communication system, for example, the WLAN system, in accordance with the embodiment of the present invention.

Referring to FIG. 2, in the WLAN system, the STAs corresponding to the multi users, for example, an STA1 250, an STA2 260, and an STA3 270 are shifted from the sleep mode state to the wake up mode and then, transmit trigger frames 252, 262, and 272 to an AP 200. In this case, as the AP 200 receives the trigger frames 252, 262, and 272, respectively, from the STAs 250, 260, 270, the unscheduled service period as a service period starts. Herein, each AC of the STAs 250, 260, 270 is designated as the trigger/delivery-enabled and the STAs 250, 260, 270 are shifted to the wake up mode state to transmit the QoS data frame or the QoS null frame, respectively, as the trigger frames 252, 262, 272. Further, the QoS null frame is transmitted so as to request the corresponding data buffered in the AP 200 to the AP 200 even though the uplink data to be transmitted to the AP 200 by the STAs 250, 260, 270 are not present.

In addition, the AP 200 receiving the trigger frames 252, 262, 272 sequentially transmits ACKs 205, 210, 215 as the acknowledgement of reception of the trigger frames 252, 262, 272 to each STA 250, 260, 270. Further, the AP 200 sequentially transmits the buffered frames 220, 225, and 230 of data to the corresponding STAs 250, 260, and 270 when the buffered data correspond to the delivery-enabled AC. In addition, the STA 250, 260, 270 receiving the buffered frames 220, 225, and 230 sequentially transmits ACKs 254, 264, and 274, respectively, as the acknowledgement of reception of the buffered frames 220, 225, and 230 to the AP 150.

In this case, as described above, the AP 200 sequentially transmits the MSDU or the A-MSDU as the buffered frames 220, 225, and 230 to the STAs 250, 260, and 270 in the service period, wherein the MSDU or the A-MSDU is less than figures designated in the maximum service period length field. Further, the buffered frames 220, 225, and 230 include the EOSP informing that the service period ends and when the buffered frame is continuously transmitted due to the presence of the buffered data in the AP 200, that is, when the service period is continued, the EOSP is set to be '0' and when the service period ends, the EOSP is set to be '1'. In this case, when all the buffered data are not transmitted in the service period, that is, when the service period ends (EOSP=1), but when the non-transmitted buffered data are present in the AP, More Data informing whether the buffered data are present is set to be '1'. Further, when all the buffered data are transmitted and thus, no data are present, the More Data is set to be '0'.

Herein, the service period becomes from a time after the trigger frames 252, 262, 272 are received to a time when the buffered frames 220, 225, 230 of which the EOSP is set to be '1' are received and the ACKs 254, 264, 274 for the buffered frames 220, 225, 230 of which the EOSP is set to be '1' is transmitted. As described above, when the EOSP is set to be '1' and the service period ends but the More Data is set to be '1', and thus, the non-transmitted buffered data are present in the AP, the non-transmitted buffered data are transmitted in the next new service period. As such, when the service period ends and all the buffered data are transmitted, the STAs 250, 260, 270 receive the buffered frames 220, 225, and 230 of which the EOSP is set to be '1' and the More data is set to be '0' and transmits the ACKs 254, 264, 274 and then, are shifted from the wake up mode state to the sleep mode state, such that the power saving efficiency of the STA 250, 260, 270 is maximized. Herein, referring to FIG. 3, when the communication system in accordance with the embodiment of the present invention provides services to the multi users by the MIMO scheme, the transmission/reception of data using the APSD scheme will be described in more detail.

Figure 3:
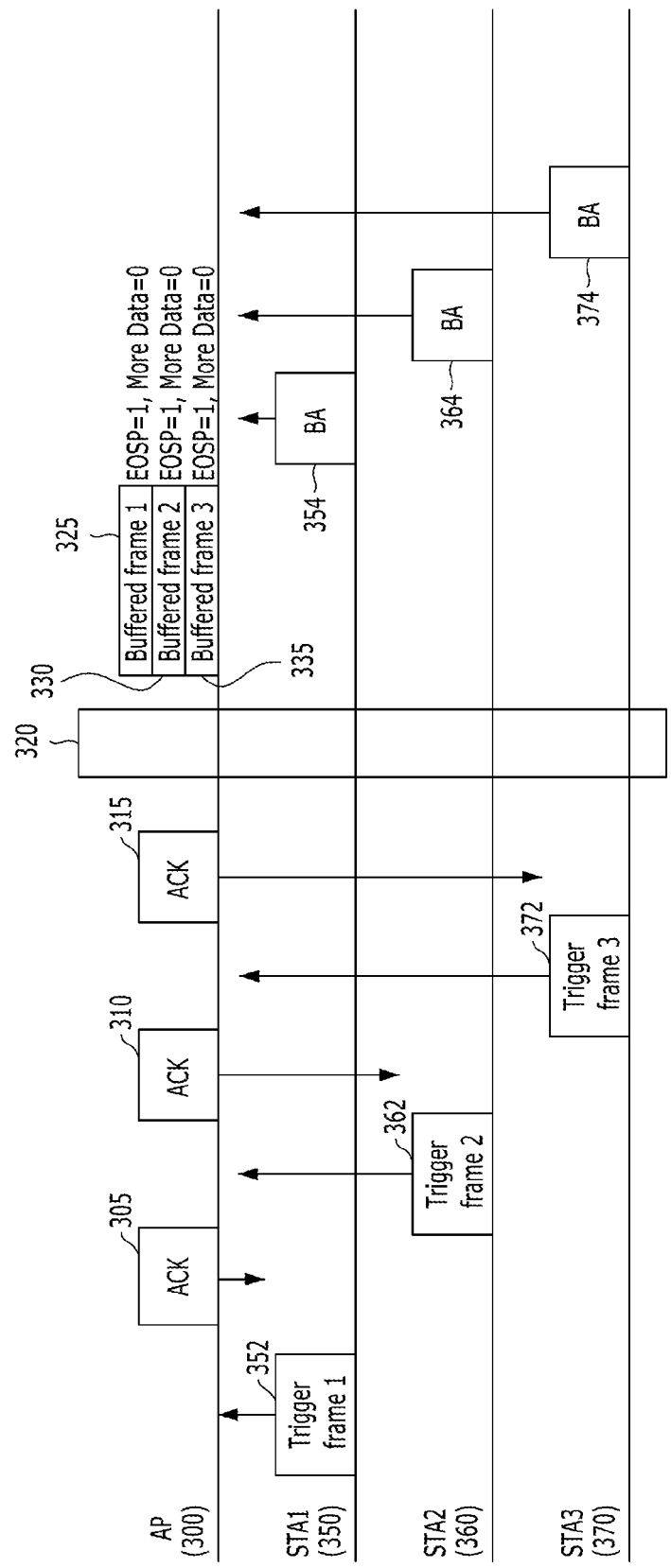

FIG. 3 is a diagram schematically illustrating a process for transmitting/receiving data in a communication system in accordance with an embodiment of the present invention. Herein, FIG. 3 is a diagram schematically showing a flow of transmitting/receiving data by a multi user-MIMO scheme and providing power saving of the STAs corresponding to the multi users by the APSD scheme, in the communication system, for example, the WLAN system in accordance with the embodiment of the present invention.

Referring to FIG. 3, in the WLAN system, the STAs corresponding to the multi users, for example, an STA1 350, an STA2 360, and an STA3 370 are shifted from the sleep mode state to the wake up mode and then, transmit trigger frames 352, 362, and 372, respectively, to an AP 300. In this case, the STAs 350, 360, and 370 and the AP 300 transmit and receive data by the multi user-MIMO scheme.

Further, as the AP 300 receives the trigger frames 352, 362, and 372, respectively, from the STAs 350, 360, and 370, the unscheduled service period as the service period starts. Herein, each AC of the STAs 350, 360, and 370 is designated as the trigger/delivery-enabled and the STAs 350, 360, and 370 are shifted to the wake up mode state to transmit the QoS data frame or the QoS null frame, respectively, as the trigger frames 352, 362, and 372. Further, the QoS null frame is transmitted so as to request the corresponding data buffered in the AP 300 to the AP 300 even though the uplink data to be transmitted to the AP 300 by the STAs 350, 360, and 370 are not present.

In addition, the AP 300 receiving the trigger frames 352, 362, and 372 sequentially transmits ACKs 305, 310, and 315 as the acknowledgement of reception of the trigger frames 352, 362, and 372 to each STA 350, 360, and 370. Further, the AP 300 performs the sounding so as to accurately estimate the channels corresponding to each STA 350, 360, and 370 in a sounding period 320 and also groups the STAs 350, 360, and 370 to transmit and receive data to and from the STAs 350, 360, and 370 by the multi user-MIMO scheme. That is, as the STAs 350, 360, and 370 that can transmit and receive to and from the AP 300 by the multi user-MIMO scheme are grouped and the STAs 350, 360, and 370 can transmit data to and from the AP 300 by the multi user-MIMO scheme, the throughput of the system is improved and the power saving efficiency of the STAs 350, 360, and 370 is also improved accordingly. In particular, as the data are transmitted and received in downlink by the multi user-MIMO scheme, the throughput of transmission/reception of data is improved and the transmission/reception of data for each STA 350, 360, and 370 are more rapidly completed, each STA 350, 360, and 370 is more rapidly shifted to the sleep mode state, thereby improving the power saving efficiency of the STAs 350, 360, and 370. In addition, the AP 300 distributes a network allocation vector to the STAs 350, 360, and 370 in the sounding period 320.

Further, the AP 300 transmits the buffered frames 325, 330, and 335 of data to the corresponding STAs 350, 360, and 370 by the multi user-MIMO scheme when the buffered data correspond to the delivery-enabled AC. In addition, each of the STAs 350, 360, and 370 receiving the buffered frames 325, 330, and 335 sequentially transmits a block ACKs (hereinafter, referred to as 'BA') 354, 364, and 374 as the acknowledgement of reception of the buffered frames 325, 330, and 335 to the AP 150.

In this case, as described above, the AP 300 transmits the MSDU or the A-MSDU as the buffered frames 325, 330, and 335 to the STAs 350, 360, and 370 by the multi user-MIMO scheme in the service period, wherein the MSDU or the A-MSDU is less than a figure designated in the maximum service period length field. Further, the buffered frames 325, 330, and 335 include the EOSP informing that the service period ends and when the buffered frame is continuously transmitted due to the presence of the buffered data in the AP 300, that is, when the service period is continued, the EOSP is set to be '0' and when the service period ends, the EOSP is set to be '1'. In this case, when all the buffered data are not transmitted in the service period, that is, when the service period ends (EOSP=1), but when the non-transmitted buffered data are present in the AP, the More Data informing whether the buffered data are present is set to be '1' and when all the buffered data are transmitted and thus, no data are present, the More Data is set to be '0'. Herein, the service period becomes from a time after the trigger frames 352, 362, and 372 are transmitted to a time when the buffered frames 325, 330, and 335 of which the EOSP is set to be '1' are received and the BAs 354, 364, and 374 for the buffered frames 325, 330, and 335 of which the EOSP is set to be '1' is transmitted. As described above, when the EOSP is set to be '1' and the service period ends but the More Data is set to be '1', and thus, the non-transmitted buffered data are present in the AP, the non-transmitted buffered data are transmitted in the next new service period. When the service period ends and all of the buffered data are transmitted, the STAs 350, 360, and 370 receive the buffered frames 325, 330, and 335 of which the EOSP is set to be '1' and the More Data is set to be '0' and thus, transmit the BAs 354, 364, and 374 and then, are shifted from the wake up mod state to the sleep mode state. In particular, as described above, as the STAs 350, 360, and 370 transmit and receive data to and from the AP 300 by the multi user-MIMO scheme, the power saving efficiency of the STAs 350, 360, and 370 are maximized and the throughput of the system is improved through the transmission/reception of data as described above. Herein, referring to FIG. 4, when the communication system in accordance with the embodiment of the present invention provides services to the multi users in the downlink, that is, when the large-capacity traffic is present in the downlink, the transmission/reception of data using the u-APSD scheme will be describe in more detail.

Figure 4:
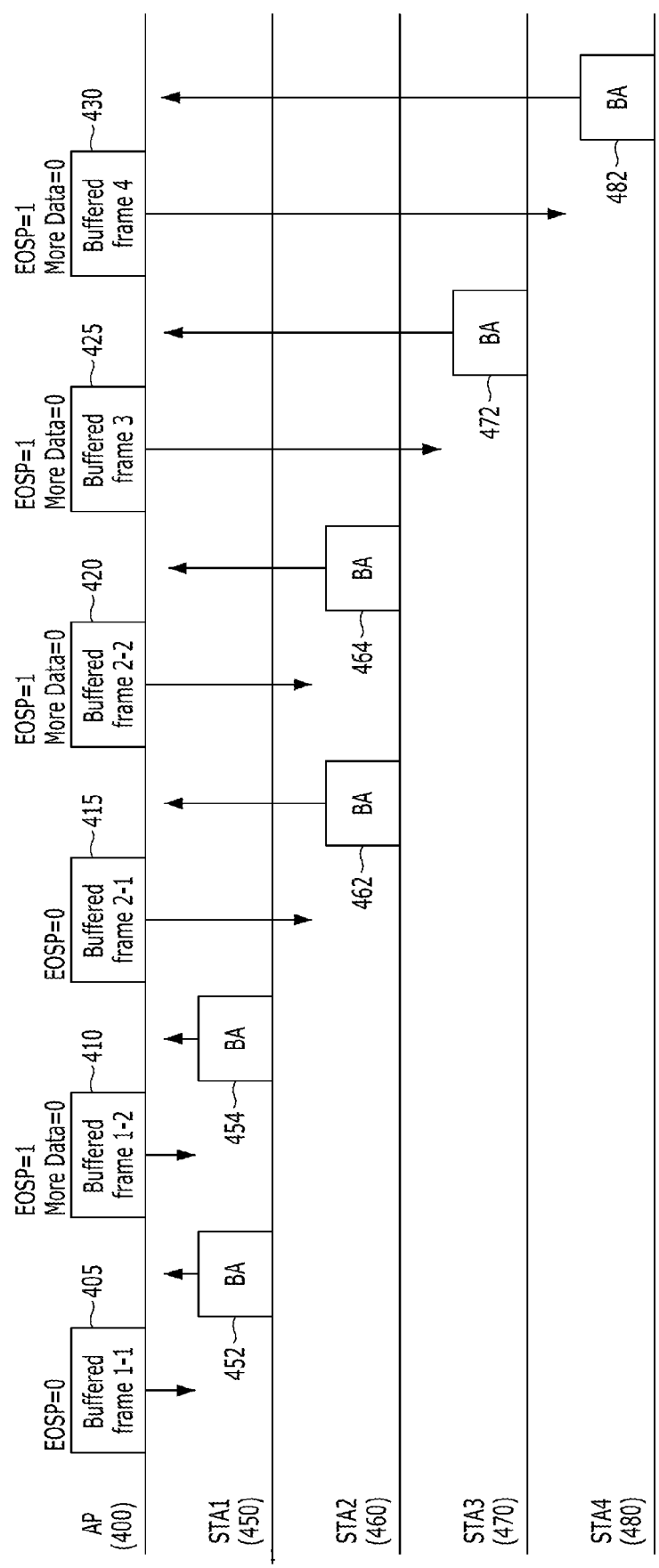

FIG. 4 is a diagram schematically illustrating a process for transmitting/receiving data in a communication system in accordance with another embodiment of the present invention. Herein, FIG. 4 is a diagram schematically showing a flow of transmitting/receiving data in the downlink by providing power saving efficiency of an STA by the u-APSD scheme when the large-capacity traffic corresponding to the multi users are present, in the communication system, for example, the WLAN system in accordance with the embodiment of the present invention.

Referring to FIG. 4, as described above, in the WLAN system, the STAs corresponding to the multi user, for example, the STA1 450, the STA2 460, the STA3 470, and the STA4 480 are shifted from the sleep mode state to the wake up mode state and then, each transmits the trigger frames to the AP 400. As the AP 400 receives the trigger frames from the STAs 450, 460, 470, and 480, respectively, the unscheduled service period starts as the service period and the AP 400 sequentially transmits the ACKs as the acknowledgement of reception of the trigger frames to each STA 450, 460, 470, and 480. Here, the transmitting/receiving operations of the trigger frames between the AP 400 and the STAs 450, 460, 470, and 480 are previously described in detail and therefore, the detailed description thereof will be omitted.

Further, the AP 400 sequentially transmits the buffered frames 405, 410, 415, 420, 425, and 430 of data to the corresponding STAs 450, 460, 470, and 480 when the buffered data corresponds to the delivery-enabled AC of the STAs 450, 460, 470, and 480. Further, the STAs 450, 460, 470, and 480 receiving the buffered frames 405, 410, 415, 420, 425, and 430 sequentially transmits BAs 452, 454, 462, 464, 472, and 482, respectively, as the acknowledgement of reception of the buffered frames 405, 410, 415, 420, 425, and 430 to the AP 150.

In this case, as described above, the AP 400 sequentially transmits the MSDU or the A-MSDU as the buffered frames 405, 410, 415, 420, 425, and 430 to the STAs 450, 460, 470, and 480 in the service period, wherein the MSDU or the A-MSDU is less than a figure designated in the maximum service period length field. Further, the buffered frames 405, 410, 415, 420, 425, and 430 include the EOSP informing that the service period ends and when the buffered frame is continuously transmitted due to the presence of the buffered data in the AP 400, that is, when the service period is continued, the EOSP is set to be '0' and when the service period ends, the EOSP is set to be '1'. In this case, when all the buffered data are not transmitted in the service period, that is, when the service period ends (EOSP=1), but when the non-transmitted buffered data is present in the AP, the More Data informing whether the buffered data are present is set to be '1'. Further, when all the buffered data are transmitted and thus, no data are not present, the More Data is set to be '0'.

Herein, the service period becomes from a time after the trigger frames are transmitted to a time when the buffered frames 410, 420, 425, and 430 of which the EOSP is set to be '1' is received and the BAs 454, 464, 472, and 482 for the buffered frame 410, 420, 425, and 430 of which the EOSP is set to be '1' is transmitted. Further, as described above, when the EOSP is set to be '1' and the service period ends but the More Data is set to be '1', and thus, the non-transmitted buffered data are present in the AP, the non-transmitted buffered data are transmitted in the next new service period. As such, when the service period ends and all the buffered data are transmitted, the STAs 450, 460, 470, and 480 receive the buffered frames 410, 420, 425, and 430 of which the EOSP is set to be '1' and the More data is set to be '0' and transmits the BAs 454, 464, 472, and 482 and then, are shifted from the wake up mode state to the sleep mode state, such that the power saving efficiency of the STAs 450, 460, 470, and 480 is maximized, thereby improving the throughput of the system through transmission/reception of data as described above. Herein, referring to FIG. 5, when the communication system in accordance with the embodiment of the present invention provides services to the multi users in the downlink by the MIMO scheme, the transmission/reception of data using the APSD scheme will be described in more detail.

Figure 5:
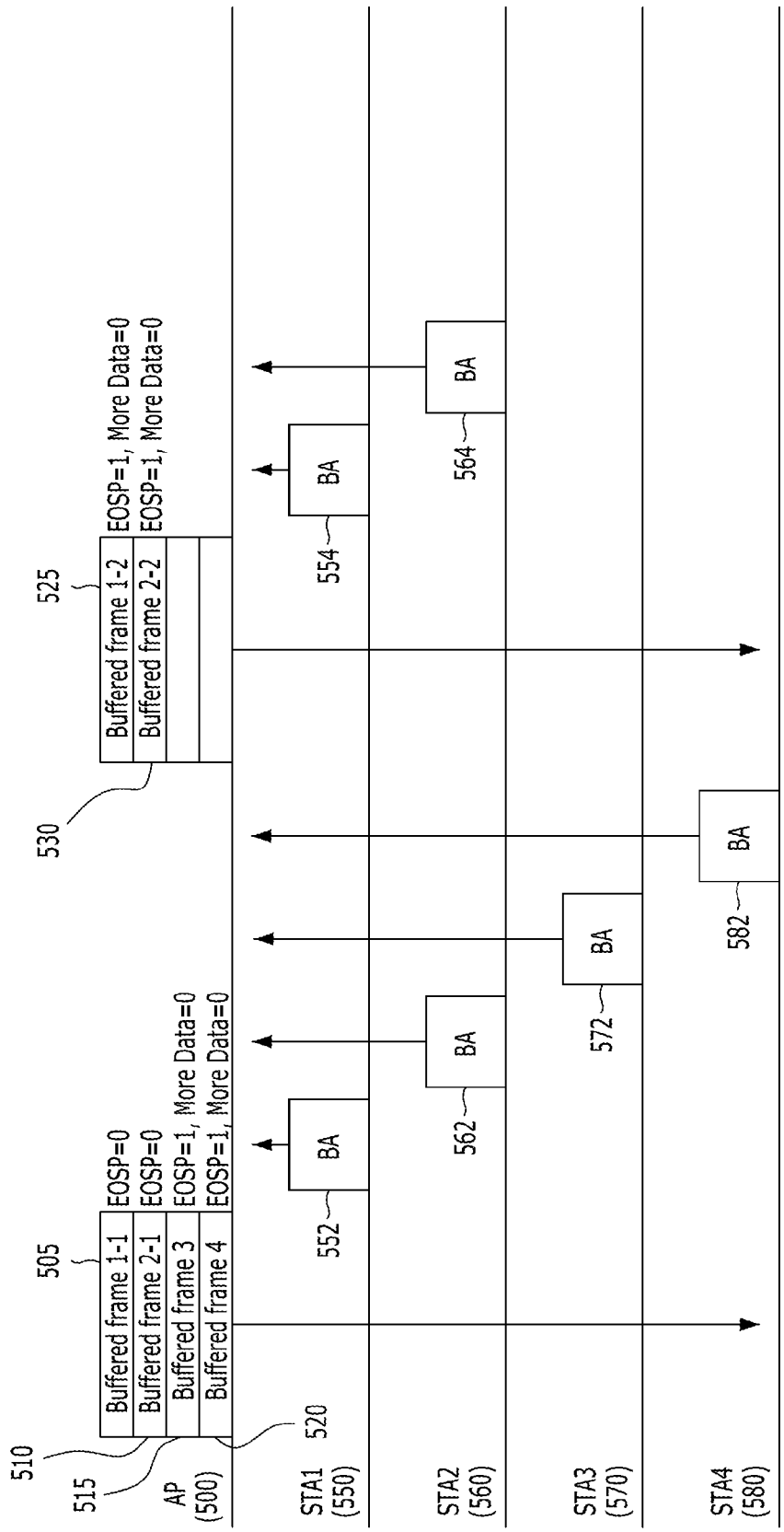

FIG. 5 is a diagram schematically illustrating a process for transmitting/receiving data in a communication system in accordance with another embodiment of the present invention. Herein, FIG. 5 is a diagram schematically showing a flow of transmitting/receiving data by a multi user-MIMO scheme by providing power saving of the STAs corresponding to the multi users by the APSD scheme, in the communication system, for example, the WLAN system in accordance with the embodiment of the present invention.

Referring to FIG. 5, as described above, in the WLAN system, the STAs corresponding to the multi user, for example, an STA1 550, an STA2 560, an STA3 570, and an STA4 580 are shifted from the sleep mode state to the wake up mode state and then, transmits the trigger frames, respectively, to the AP 500. As the AP 500 receives the trigger frames from the STAs 550, 560, 570, and 580, respectively, the unscheduled service period starts as the service period and the AP 500 sequentially transmits the ACKs as the acknowledgement of reception of the trigger frames to each STA 450, 460, 470, and 480 and then, estimates the channel, groups the STAs 550, 560, 570, and 580, and distributes the NAV in the sounding period. In this case, the STAs 550, 560, 570, and 580 and the AP 500 transmit and receive data by the multi users-MIMO scheme.

That is, as described above, the AP 500 transmits and receives data to and from the STAs 550, 560, 570, and 580 by the multi user-MIMO scheme and thus, the throughput of the system is improved and the power saving efficiency of the STAs 550, 560, 570, and 580 is improved accordingly. In particular, as data are transmitted and received in the downlink by the multi user-MIMO scheme, the throughput of transmission/reception of data is improved and the transmission/reception of data for each STA 550, 560, 570, and 580 are more rapidly completed, such that each STA 550, 560, 570, and 580 is more rapidly shifted to the sleep mode state, thereby improving the power saving efficiency of the STAs 550, 560, 570, and 580. Here, the transmitting/receiving operation of the trigger frames between the AP 500 and the STAs 550, 560, 570, and 580 and the operation in the sounding period are previously described in detail and therefore, the detailed description thereof will be omitted.

Further, the AP 500 transmits buffered frames 505, 510, 515, 520, 525, and 530 of data to the corresponding STAs 550, 560, 570, and 580 by the multi user-MIMO scheme when the buffered data correspond to the delivery-enabled AC. Further, the STAs 550, 560, 570, and 580 receiving the buffered frames 505, 510, 515, 520, 525, and 530 sequentially transmits BAs 552, 562, 572, 582, 554, and 564, respectively, as the acknowledgement of reception of the buffered frames 505, 510, 515, 520, 525, and 530 to the AP 500.

In this case, as described above, the AP 500 transmits the MSDU or the A-MSDU as the buffered frames 505, 510, 515, 520, 525, and 530 to the STAs 550, 560, 570, and 580 in the service period by the multi user-MIMO scheme, wherein the MSDU or the A-MSDU is less than a figure designated in the maximum service period length field. Further, the buffered frames 505, 510, 515, 520, 525, and 530 include the EOSP informing that the service period ends and when the buffered frame is continuously transmitted due to the presence of the buffered data in the AP 500, that is, when the service period is continued, the EOSP is set to be '0' and when the service period ends, the EOSP is set to be '1'. In this case, when all the buffered data are not transmitted in the service period, that is, when the service period ends (EOSP=1) but when the non-transmitted buffered data are present in the AP, More Data informing whether the buffered data are present is set to be '1'. Further, when all the buffered data are transmitted and thus, no data are present, the More Data is set to be '0'. Herein, the service period becomes from a time after the trigger frames are transmitted to a time when the buffered frames 515, 520, 525, and 530 of which the EOSP is set to be '1' is received and the BAs 572, 582, 554, and 564 for the buffered frame 515, 520, 525, and 530 of which the EOSP is set to be '1' is transmitted. Further, as described above, when the EOSP is set to be '1' and the service period ends but the More Data is set to be '1', and thus, the non-transmitted buffered data are present in the AP, the non-transmitted buffered data are transmitted in the next new service period. When the service period ends and all of the buffered data are transmitted, that is, the STAs 550, 560, 570, and 580 receive the buffered frames 515, 520, 525, and 530 of which the EOSP is set to be '1' and the More Data is set to be '0' and transmit the BAs 572, 582, 554, and 564, the STAs 550, 560, 570, and 580 are shifted from the wake up mode state to the sleep mode state. In particular, as described above, as the STAs 550, 560, 570, and 580 transmit and receive data to and from the AP 500 by the multi user-MIMO scheme, the power saving efficiency of the STAs 550, 560, 570, and 580 are maximized and the throughput of the system is improved through the transmission/reception of data as described above. Herein, referring to FIGS. 6 and 7, when data are transmitted and received between the AP and the STAs by the multi user-MIMO scheme providing the power saving of the STAs by the APSD scheme in the communication system in accordance with the embodiment of the present invention, the data packet for informing the multi user of the AP and the APSD support will be described in more detail.

FIGS. 6 and 7 are diagrams schematically showing a data packet structure in the communication system in accordance with an embodiment of the present invention. FIGS. 6 and 7 are diagrams schematically showing the structure in which the power saving of the STAs corresponding to the multi users is provided by the multi user-APSD scheme and the data packet is transmitted and received to inform the STAs of the transmission/reception of data through the downlink frame by the multi user-MIMO scheme, in the communication system in accordance with the embodiment of the present invention, for example, the WLAN system. In addition, FIG. 6 is a diagram schematically showing the data packet structure when informing the support of the multi user-APSD of the AP using, a capability information field of a downlink frame, for example, a beacon frame, a probe response frame, an association response frame, or the like and FIG. 7 is a diagram schematically showing a data packet structure when informing the support of the multi user-APSD of the AP using a high throughput capability element (HT capability element).

Referring to FIG. 6, the data packet uses the capability information field to allow the AP to transmit and receive data by the multi user-MIMO scheme and informs the STAs of the support of the multi user-APSD scheme for the power saving of the STAs. That is, the data packet uses an APSD field 626 in a subfield 602 of the capability information field to inform the STAs whether the APSD scheme of the AP is supported. In particular, the data packet sets the APSD field 626 to be '1' to inform the support of the APSD scheme of the AP and sets a Reserved field 628 to be '1' to inform the multi user-APSD support of the AP. That is, it is informed to the STAs through the APSD 626 and the Reserved field 628 that the AP supports the multi user-APSD, that is, the AP supports the power saving of the STAs by the multi user APSD scheme for the plurality of STAs.

Herein, the data packet includes the APSD field 626 and the Reserved field 628 as well as an ESS field 604, an IBSS field 606, a CF-Pollable field 608, a CF-Poll Request field 610, a Privacy field 612, a short preamble field 614, a PBCC field 616, a channel agility field 618, a spectrum management field 620, a QoS field 622, a short slot time field 624, a DSS-OFDM field 630, a delayed block Ack field 632, and an immediate block Ack field 634 as the subfield 602 of the capability information field.

Referring to FIG. 7, the data packet uses the HT capability element, in particular, an HT extended capabilities element of the HT capability element to allow the AP to transmit and receive data by the multi user-MIMO scheme and informs the STAs the support of the multi user-APSD scheme for the power saving of the STAs. That is, the data packet sets a Reserved field 716 to be '1' in a subfield 702 of the HT extended capabilities element to inform the STAs that the AP supports the multi user-APSD, that is, the AP supports the power saving of the STAs by the multi user-APSD scheme for the plurality of STAs.

In this case, the data packet informing the support of the multi user-APSD of the AP using the Reserved field 716 in the subfield 702 of the HT extended capabilities element is combined with the data packet informing the APSD support by using the APSD field 626 in the subfield 602 of the capability information field described in FIG. 6, which may be broadcast to the STAs. That is, the APSD field 626 is set to be '1' in the subfield 602 of the capability information field, and the Reserved field 716 is set to be '1' in the subfield 702 of the HT extended capabilities element, thereby informing the STAs that the AP supports both the existing APSD and the multi user APSD.

In this case, the data packet includes the Reserved field 716 as well as a PCO field 704, a PCO transition time field 706, a reserved field 708, an MCS feedback field 710, a + HTC support field 712, and an RD responder field 714. Herein, referring to FIGS. 8 and 9, when data are transmitted and received data between the AP and the STAs by the multi user-MIMO scheme by providing the power saving of the STAs by the multi user-APSD scheme in the communication system in accordance with the embodiment of the present invention, the data packet for setting the AC trigger/delivery-enabled of the AC in the STA will be described in more detail.

FIGS. 8 and 9 are diagrams schematically showing a data packet structure in the communication system in accordance with an embodiment of the present invention. FIGS. 8 and 9 are diagrams schematically showing a data packet structure transmitted and received to inform the AP that the STA sets the multi user-trigger/deliver-enabled when the data are transmitted and received by the multi user-MIMO scheme by providing the power saving of the STAs corresponding to the multi users by the multi user-APSD scheme, in the communication system, for example, the WLAN system, in accordance with the embodiment of the present invention. In addition, FIG. 8 is a diagram schematically showing a data packet structure when the STA informs the AP of the multi user-trigger-enable/multi use-delivery-enabled setting of the AC by using the HT capabilities element of the transmission frame and FIG. 9 is a diagram schematically showing a data packet structure when the STA informs the AP of the multi user-trigger-enable/multi-user-delivery-enabled setting of the AC by using an add-traffic-stream (ADDTS) Request frame.

Referring to FIG. 8, the data packet uses the HT capabilities element, in particular, the HT extended capabilities element of the HT capabilities element to inform that the STA sets the multi user-trigger-enable/multi user-delivery-enabled for each AC. That is, the data packet allows the STA to use a Reserved field 816 in a subfield 802 of the HT extended capabilities element as a flag indicating the multi user-trigger-enable/multi user-delivery-enabled for each AC to inform the AP that the STA sets the multi user-trigger-enabled/multi user-delivery-enabled for each AC.

For example, the Reserved field 816, which is a flag indicating the multi user-trigger-enabled/multi user-delivery-enabled for each AC, includes an AC_VO MU_APSD Flag bit 818, an AC_VI MU_APSD Flag bit 820, an AC_BK MU_A-PSD Flag bit 8222, and an AC_BE MU_APSD Flag bit 824, wherein each Flag indicates the multi user-trigger-enabled/multi user-delivery-enabled of the corresponding AC. For example, when the AC_VO MU_APSD Flag bit 818 is set to be '1', the AC_VO of the STA indicates the multi user-trigger-enabled/multi user-delivery-enabled.

In this case, the data packet includes the Reserved field 816 as well as a PCO field 804, a PCO transition time field 806, a reserved field 808, an MCS feedback field 810, a + HTC support field 812, and an RD responder field 814 as the subfield 802 of the HT extended capability.

Further, referring to FIG. 9, the data packet uses a traffic stream (TS) Info field of a traffic specification (TSPEC) element in the ADDIS Request frame, in particular, the ADDIS Request frame to inform that the corresponding STA sets the multi user-trigger-enabled/multi user-delivery-enabled for each AC. That is, the data packet indicates whether the STA supports the multi user-APSD of each AC using a Reserved field 922 in a subfield 902 of the TS Info field and informs the AP that the corresponding STA supports the multi user-APSD for each AC together with other subfields of the TS Info field and sets the multi user-trigger-enabled/multi user-delivery-enabled.

For example, in the reserved field 922, 1 bit is used to indicate whether the multi user-APSD for the corresponding AC is supported. In this case, 1 bit is set to be '1', which indicates that the corresponding AC of the STA supports the multi user APSD. Describing in more detail, in the subfield 902 of the TS Info field of the TSPEC element, an APSD field 914 is set to be '1', a Schedule field 920 is set to be '0', and a Direction field 908 is set to be uplink and when 1 bit of the Reserved field 922 is set to be '1', the AC defined by a User Priority field 916 supports the multi user-u-APSD and means the multi user-trigger-enabled. Further, in the subfield 902 of the TS Info field of the TSPEC element, the APSD field 914 is set to be '1', the Schedule field 920 is set to be '0', and the Direction field 908 is set to be downlink and when 1 bit of the Reserved field 922 is set to be '1', the AC defined by the User Priority field 916 supports the multi user-u-APSD and means the multi user-delivery-enabled.

Here, the data packet includes the direction field 908, the APSD field 914, the User Priority field 916, the Schedule field 920, and the Reserved field 922 as well as a Traffic Type field 904, a TSID field 906, an Access Policy field 910, an Aggregation field 912, and a TSinfo Ack policy field 918 as the subfield 902 of the TS Info field.

Further, the multi delivery-enabled/trigger-enabled of the AC may be indicated using the HT capabilities element and the ADDTS Request frame as well as a QoS capability element. In this case, 4 bit of the QoS capability element is used as a flag indicating the multi user trigger-enabled/delivery-enable of the AC. Here, referring to FIG. 10, when the communication system in accordance with the embodiment of the present invention provides services by the multi user-MIMO scheme in the uplink and downlink, the transmission/reception of data using the u-APSD scheme will be described in more detail.

Figure 10:
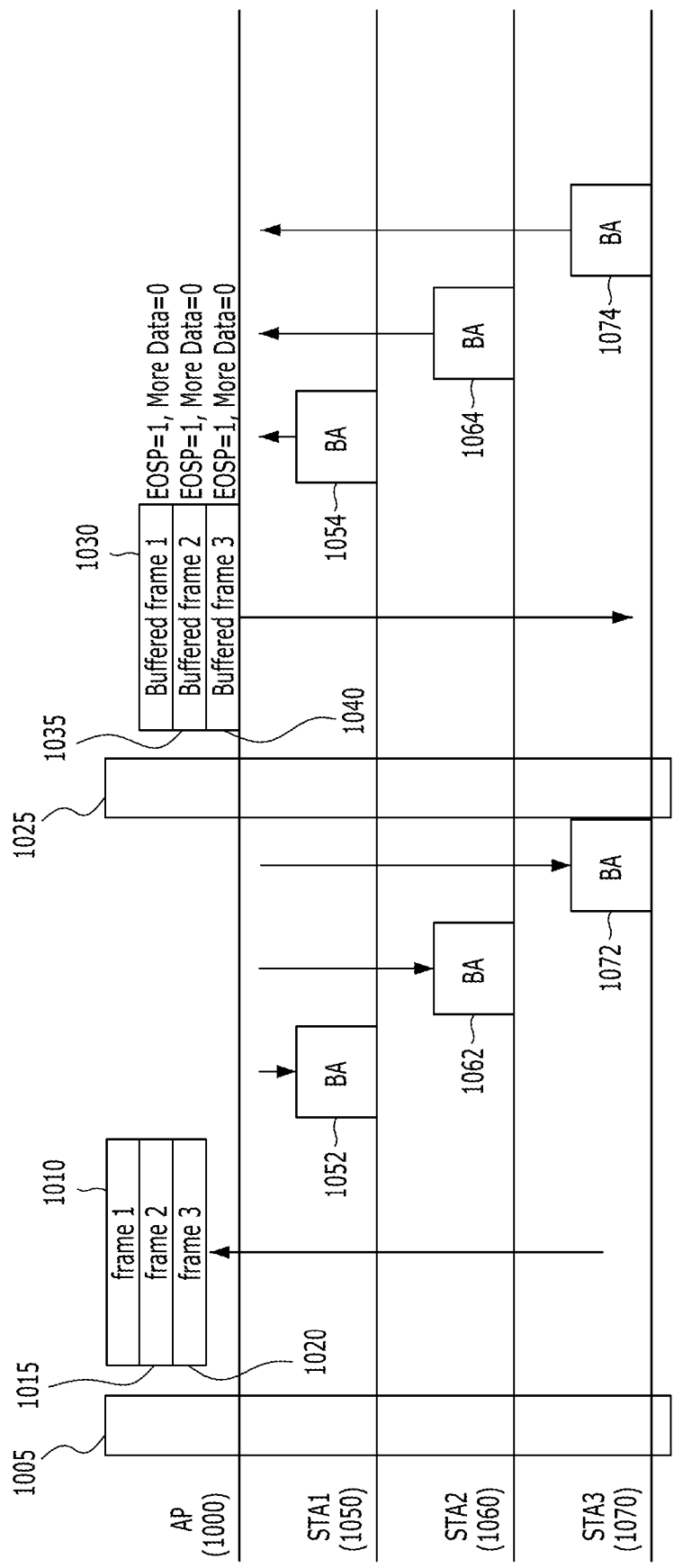

FIG. 10 is a diagram schematically illustrating a process for transmitting/receiving data in a communication system in accordance with an embodiment of the present invention. Here, FIG. 10 is a diagram schematically showing a flow of transmitting/receiving data in the uplink and downlink by a multi user-MIMO scheme by providing power saving of the STAB corresponding to the multi users by the u-APSD scheme, in the communication system, for example, the WLAN system in accordance with the embodiment of the present invention.

Referring to FIG. 10, in the WLAN system, in order for the STAB corresponding to the multi users, for example, an STA1 1050, an STA2 1060, and an STA3 1070 to be shifted from the sleep mode state to the wake up mode and then, transmit trigger frames 1010, 1015, and 1020, respectively, to an AP 1000, the STAs 1050, 1060, and 1070 perform channel access based on an enhanced distributed channel access (EDCA) in a sounding period 1005 and then, request their own transmission opportunity (TXOP) allocation, spatial stream allocation, or the like, for frame transmission to the uplink to the AP 1000. Further, the AP 1000 transmits the information on the TXOP allocation, the spatial stream allocation, or the like, to the STAs 1050, 1060, and 1070 according to the request of the STAs 1050, 1060, and 1070 and sets the NAV to protect the transmission in the uplink of the STAs 1050, 1060, and 1070 by the multi user-MIMO scheme. In this case, the STAs 1050, 1060, and 1070 and the AP 1000 transmit and receive data in the uplink by the multi user-MIMO scheme and transmit and receive data even in the downlink to be described below by the multi user-MIMO scheme.

Further, the STAs 1050, 1060, and 1070 associated with resources necessary for transmission in the uplink from the AP 1000 simultaneously transmit the trigger frames 1010, 1015, and 1020 to the AP 1000 by using the multi user-MIMO scheme. As described above, as the AP 1000 and the STAs 1050, 1060, and 1070 transmit and receive the trigger frames 1010, 1015, and 1020 by the multi user-MIMO scheme, the throughput of the system is improved and the transmitting time is reduced and thus, the power saving efficiency of the STAs 550, 560, 570, and 580 is improved accordingly.

In addition, the AP 1000 receiving the trigger frames 1010, 1015, and 1020 sequentially transmits BAs 1052, 1062, and 1072 as the acknowledgement of reception of the trigger frames 1010, 1015, and 1020 to each STA 1050, 1060, and 1070. Further, the AP 1000 accurately estimates the channels corresponding to each STA 1050, 1060, and 1070 in a sounding period 1025 and also groups the STAs 1050, 1060, and 1070 to transmit and receive data to and from the STAs 1050, 1060, and 1070 in the downlink by the multi user-MIMO scheme. The STA grouping for the downlink transmission is the same as the STA grouping used in the uplink transmission.

But the STA grouping for the downlink can be changed from the STA grouping used in the uplink transmission if it is necessary. That is, as the STAs 1050, 1060, and 1070 that can transmit and receive to and from the AP 1000 by the multi user-MIMO scheme are grouped and the STAs 1050, 1060, and 1070 can transmit data to and from the AP 1000 by the multi user-MIMO scheme, the throughput of the system is improved and the power saving efficiency of the STAs 1050, 1060, and 1070 is also improved accordingly. In particular, as the data are transmitted and received in a downlink by the multi user-MIMO scheme, similar to the uplink, the throughput of transmission/reception of data is improved and the transmission/reception of data for each STAs 1050, 1060, and 1070 are more rapidly completed, each STA 1050, 1060, and 1070 is more rapidly shifted to the sleep mode state, thereby improving the power saving efficiency of the STAs 1050, 1060, and 1070. In addition, the AP 1000 distributes the NAV to the STAs 1050, 1060, and 1070 in the sounding period 1025.

Further, the AP 1000 transmits the buffered frames 1030, 1035, and 1040 of the data to the corresponding STAs 1050, 1060, and 1070 by the multi user-MIMO scheme when the buffered data correspond to the multi user-delivery-enabled AC. Further, the STAs 1050, 1060, and 1070 receiving the buffered frames 1030, 1035, and 1040 sequentially transmits BAs 1054, 1064, and 1074, respectively, as the acknowledgement of reception of the buffered frames 1030, 1035, and 1040 to the AP 150.

In this case, as described above, the AP 1000 sequentially transmits the MSDU or the A-MSDU as the buffered frames 1030, 1035, and 1040 to the STAs 1050, 1060, and 1070 by the multi user-MIMO scheme, wherein the MSDU or the A-MSDU is less than a figure designated in the maximum service period length field in the service period. Further, the buffered frames 1030, 1035, and 1040 include the EOSP informing that the service period ends and when the buffered frames are continuously transmitted due to the presence of the buffered data in the AP 1000, that is, when the service period is continued, the EOSP is set to be '0' and when the service period ends, the EOSP is set to be '1'. In this case, when all the buffered data are not transmitted within the service period, that is, when the service period ends (EOSP=1) but when the non-transmitted buffered data are present in the AP, More Data informing whether the buffered data are present is set to be '1'. Further, when all the buffered data are transmitted and thus, no data are present, the More Data is set to be '0'. Here, the service period ends after the buffered frames 1030, 1035, and 1040 of which the EOSP is set to be '1' are received and the BAs 1054, 1064, and 1074 for the buffered frames 1030, 1035, and 1040 of which the EOSP is set to be '1' are transmitted. Further, as described above, when the EOSP is set to be '1' and the service period ends, but the More Data is set to be '1', and thus, the non-transmitted buffered data are present in the AP, the non-transmitted buffered data are transmitted in the next new service period. When the service period ends and all of the buffered data are transmitted, the STAs 1050, 1060, and 1070 receive the buffered frames 1030, 1035, and 1040 of which the EOSP is set to be '1' and the More Data is set to be '0' and thus, transmit the BAs 1054, 1064, and 1074 and then, are shifted from the wake up mod state to the sleep mode state. In particular, as described above, as the STAs 1050, 1060, and 1070 transmit and receive data to and from the AP 1000 by the multi user-MIMO scheme, the power saving efficiency of the STAs 1050, 1060, and 1070 are maximized and the throughput of the system is improved through the transmission/reception of data as described above. Here, the AP in a communication system in accordance with the embodiment of the present invention will be described in more detail with reference to FIG. 11.

Figure 11:
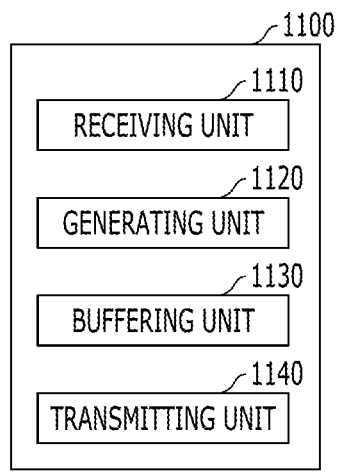
FIG. 11 is a diagram schematically illustrating a structure of an AP in the communication system in accordance with the embodiment of the present invention.

FIG. 11 is a diagram schematically illustrating a structure of an AP in the communication system in accordance with the embodiment of the present invention.

Referring to FIG. 11, as described above, the AP is configured to include a receiving unit 1110 receiving data from the STAs in the uplink by the multi user-MIMO scheme, a generating unit 1120 generating the data packet to be transmitted to the STAs, a buffering unit 1130 buffering data corresponding to the STAs, and a transmitting unit 1140 transmitting the data packet including the frame corresponding to the buffered data in the downlink by the multi user-MIMO scheme.

Here, as described above, the receiving unit 1110 and the transmitting unit 1140 transmit and receive data to and from the STAs in the uplink and downlink, that is, transmit the uplink frame and the downlink frame. Further, the generating unit 1120 generated the data packet for supporting the multi user-APSD scheme so as to maximize the power saving efficiency of the STAs. Here, the operation of the AP in a communication system in accordance with the embodiment of the present invention will be described in more detail with reference to FIG. 13.

Figure 13:
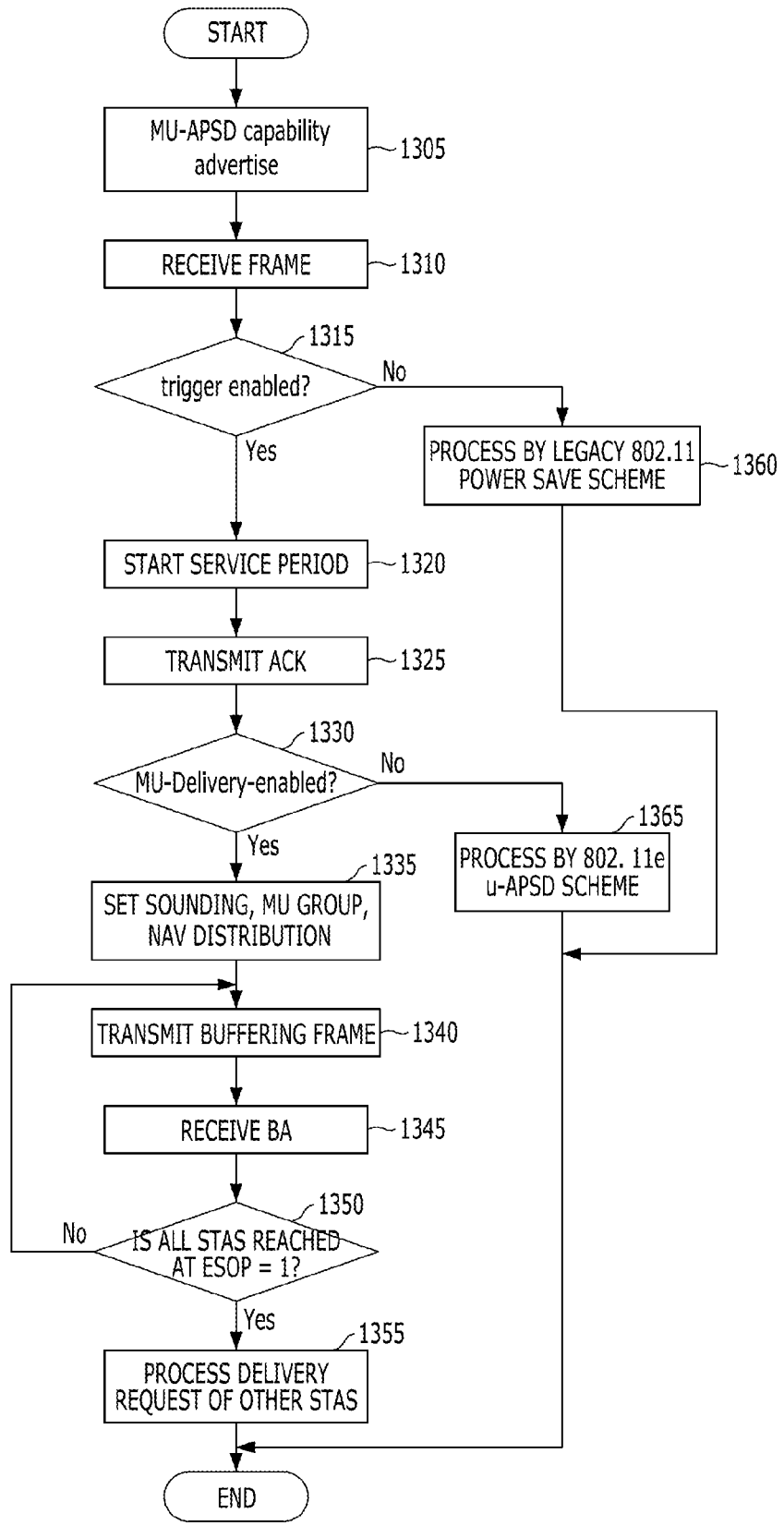
FIG. 13 is a diagram schematically illustrating an operating process of the AP in the communication system in accordance with the embodiment of the present invention.

FIG. 13 is a diagram schematically illustrating an operating process of the AP in the communication system in accordance with the embodiment of the present invention.

Referring to FIG. 13, the AP supports the multi user-APSD so as to maximize the power saving of the SATs at S1305 and thus, generates the data packet as described above and broadcasts the generated data packet to the STAs, thereby informing the STAs of the multi user-APSD support of the AP. Here, the AP broadcasts the data packet, for example, the beacon frame, the association response frame, or the like, to the STAs to inform the STAs that the AP supports the multi user-APSD.

Further, at S1310, the trigger frames are received from the STAs supporting the multi user-APSD and at S1315, it is confirmed whether the AC of the STAs corresponding to the buffered data is trigger-enabled to the AP.

As the confirmation result at S1315, if it is determined that the AC of the STAs corresponding to the buffered data is trigger-enabled to the AP, the service period starts at S1320 and the ACK or the BA as the acknowledgement of reception of the trigger frame is transmitted to the STAs.

Thereafter, at S1330, it is confirmed whether the AC of the STAs corresponding to the buffered data is multi user-delivery-enabled to the AP. At the confirmation result at S1330, when each AC of the STAs corresponding to the buffered data is multi user delivery-enabled to the AP, the channel estimation of the STAs is performed in the sounding period so as to accurately estimate the channel, and the AP groups the STAs and NAV is distributed.

Next, at S1340, the buffered frames for the corresponding STAs including the buffered data are transmitted to the STAs by the multi user-MIMO scheme, that is, the downlink frames are transmitted. Here, EOSP bit and More Data bit of the downlink frames for each STA are set and transmitted. When the number of MSDUs or A-MSDUs transmitted to the corresponding STA exceeds the setting of MAX SP Length field or there are no frames to be additionally transmitted at the time of next transmission, the EOSP is set to be 1. When there are no frames to be additionally transmitted at the time of next transmission, the More Data is set to be 0. When the service period ends due to the excess of the MAX SP Length field but the buffered data still remain in the AP, the EOSP is set to be 1 and the More Data is set to be 1. Further, as described above, the information indicating that the AP supports the multi user-APSD scheme is included in the downlink frame and the information on the setting of the multi user-trigger-enabled/multi user-delivery-enabled for the AC of the STA is included therein. Next, at step 1345, the ACK or the BA as the acknowledgement of reception of the buffered frame is received from the STAs.

Further, at S1350, it is confirmed whether there are the buffered data to be transmitted to the STAs, that is, the EOSP of the buffered frame is set to be '1'. As the confirmation result at S1350, when there are the buffered data to be transmitted to the STAs, the process proceeds to S1340 and when there are no buffered data to be transmitted to the STAs, at S1355, the data delivery request corresponding to the STAs is processed, that is, the transmission/reception of data in the downlink ends.

Meanwhile, as the confirmation result at S1315, if it is determined that the AC of the STAs corresponding to the buffered data is not trigger-enabled to the AP, the transmission/reception of data in the downlink by the power saving scheme in the legacy IEEE. 802.11 system are performed. Further, as the confirmation result at S1330, if it is determined that the AC of the STAs corresponding to the buffered data is not delivery-enabled to the AP, the transmission/reception of data in the downlink by the u-APSD scheme in the legacy IEEE. 802.11 system are performed. Here, the STA in a communication system in accordance with the embodiment of the present invention will be described in more detail with reference to FIG. 12.

Figure 12:
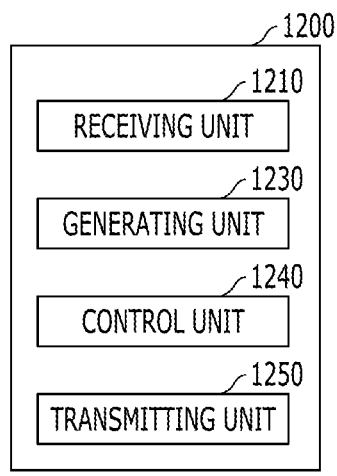
FIG. 12 is a diagram schematically illustrating a structure of an STA in the communication system in accordance with the embodiment of the present invention.

FIG. 12 is a diagram schematically illustrating a structure of the STA in the communication system in accordance with the embodiment of the present invention.

Referring to FIG. 12, as described above, the STA is configured to include a receiving unit 1210 receiving data, that is, the downlink frame from the AP in the downlink by the multi user-MIMO scheme, a generating unit 1230 generating data to be transmitted to the AP, for example, the trigger frame in the uplink, a control unit 1240 controlling state shifting between the sleep mode and the wake mode for the power saving of the STA according to the service period corresponding to the transmission and reception of data to and from the AP, and a transmitting unit 1250 transmitting data, that is, the uplink frame to the AP in the uplink by the multi user-MIMO scheme.

Here, as described above, the receiving unit 2110 and the transmitting unit 2150 transmits and receives data to the AP in the uplink and downlink by the multi user-MIMO scheme and the control unit 1240 controls the state shifting between the slip mode and the wake mode according to the service period so as to maximize the power saving efficiency of the STA. Here, the operation of the STA in a communication system in accordance with the embodiment of the present invention will be described in more detail with reference to FIG. 14.

Figure 14:
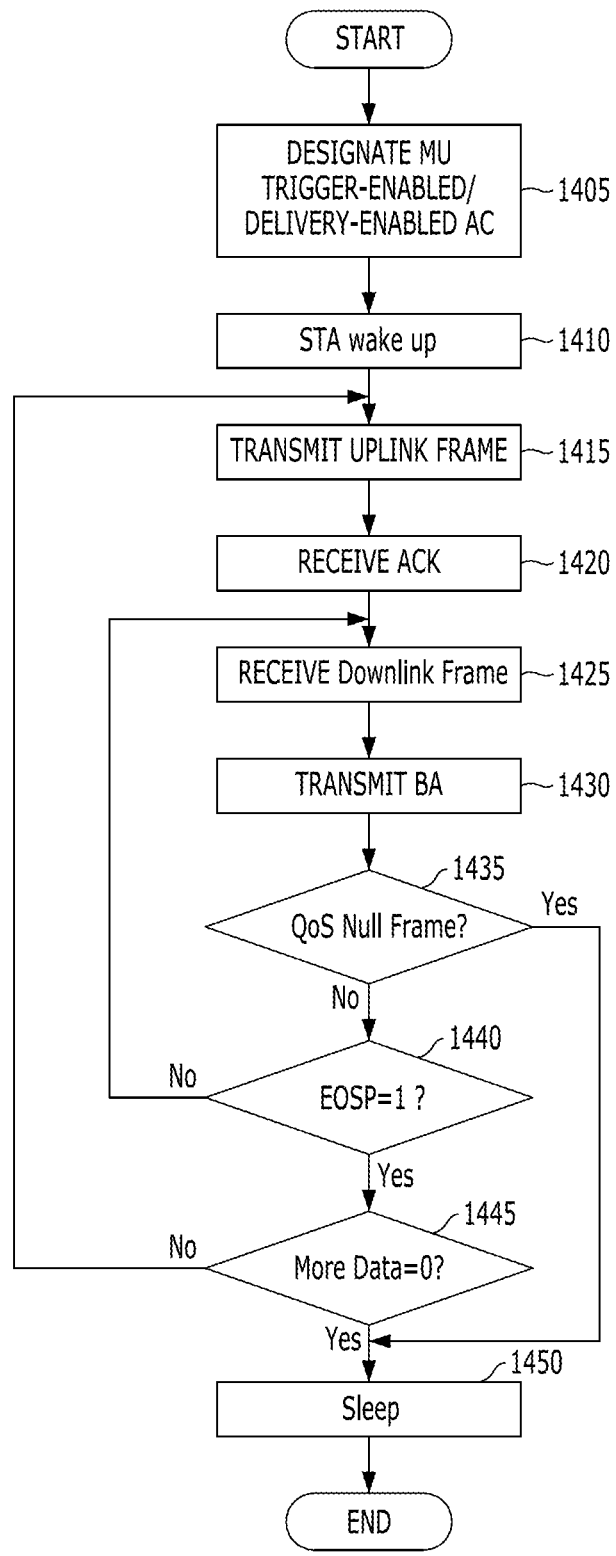
FIG. 14 is a diagram schematically illustrating an operating process of the STA in the communication system in accordance with the embodiment of the present invention.

FIG. 14 is a diagram schematically illustrating an operating process of the STA in the communication system in accordance with the embodiment of the present invention.

Referring to FIG. 14, at S1405, the STA supports the multi user-APSD and thus, as described above, the multi user-trigger-enabled/multi user-delivery-enabled of the AC are designated through the association request frame or the ADDTS frame.

Then, at S1410, if the STA has data to be transmitted to the AP, or if the STA needs to transmit the trigger frames, for example, if it needs to confirm whether there are data corresponding to the buffered STA in the AP, the sleep state is shifted to the wake up state.

Further, at S1415, data, that is, the uplink frames are transmitted to the AP. In this case, when there are data to be actually transmitted, the QoS data are transmitted and when confirming the buffered data in the AP without data to be actually transmitted, the trigger frame, for example, the QoS null frame or the PS-Poll frame for legacy power saving is transmitted.

Next, at S1420, the ACK or the BA as the acknowledgement of reception of, the data transmission, for example, the QoS data or the QoS null frame or the PS-Poll frame is received from the AP and at S1425, the data, for example, the downlink frames are received from the AP by the multi user-MIMO scheme. Here, the STA receives the buffered frame corresponding to the STA buffered in the AP as the downlink frame or receives the QoS null frame when there are on buffered data in the AP.

At S1430, the BA as the acknowledgement of reception of data from the AP is transmitted to the AP, at S1435, it is confirmed whether the received data, that is, the downlink frames are the QoS null frame, and as a confirmation result at S1435, if it is determined that the downlink frames are the QoS null frame, at S1450, the service period ends and the wake mode state is shifted to the sleep mode state.

Further, as the confirmation result at S1435, if it is determined that the received data are not the QoS null frame, at S1440, it is confirmed whether the EOSP of the received frame is set to be '1' and if it determined that the EOSP is not '1', the buffered frames are additionally present in the AP and thus, at S1425, the process of receiving the multi user-MIMO is performed again.

Further, when the EOSP is set to be '1', at S1445, it is confirmed that the More Data of the frame is set to be '0'. Here, when the More Data=0, the frames to be received are no further present and therefore, at S1450, the shifting to the sleep mode state is performed. In this case, when the EOSP=1 and the More Data=1, the service period ends but the buffered frame is still present in the AP and therefore, at step S1415, the uplink frame is transmitted without shifting to the sleep mode state so as to receive the buffered frame.

The embodiments of the present invention can control the power saving of the system by various power saving schemes to improve the throughput through the limited resources while maximizing the power saving efficiency of the system, thereby stably transmitting/receiving the large-capacity data at a high rate. Further, the exemplary embodiments of the present invention can maximize the power saving efficiency of the STAs of the communication system using various power saving schemes to provide services to multi users by the MIMO scheme, thereby stably transmitting/receiving data at a high rate.

While the present invention has been described with respect to the specific embodiments, it will be apparent to those skilled in the art that various changes and modifications may be made without departing from the spirit and scope of the invention as defined in the following claims.

What is claimed is:

1. An apparatus for transmitting data in a communication system including an access point (AP) and a plurality of terminals, the apparatus comprising:
    a receiving unit configured to receive an uplink frame from each of the terminals by a multi user-multiple input multiple-output (MIMO) scheme;
    a generating unit configured to generate a packet including support information on a multi user-power saving scheme of the terminals;
    a buffering unit configured to respectively buffer data corresponding to said each of the terminals in order to be transmitted to the terminals; and
    a transmitting unit configured to simultaneously transmit a downlink frame including the generated packet and the buffered data to the terminals by the multi user-MIMO scheme,
    wherein the buffered data corresponding to said each of the terminals are aggregated in the downlink frame, and simultaneously transmitted to the terminals through the downlink frame,
    wherein the support information includes enable setting information on the terminals corresponding to the multi user-power saving scheme,
    wherein the enable setting information is included in transmission frames,
    wherein buffered frames including the buffered data are transmitted to the terminals by the multi user-MIMO scheme,
    wherein an end of service period (EOSP) bit and More Data bit of the downlink frame for each of the terminals are transmitted,
    wherein, when the number of medium access control (MAC) service data units (MSDUs) or aggregated MSDUs (A-MSDUs) transmitted to the terminals exceeds the setting of a max service period (SP) length field or there are no frames to be additionally transmitted at the time of next transmission, a service period ends, and
    wherein, when the downlink frames for the terminals are determined to be quality of service (QoS) null frames, the service period ends and a wake up mode is shifted to a sleep mode.

2. The apparatus for transmitting data of claim 1, wherein the support information is included in a capability information field of the transmission frames.

3. The apparatus for transmitting data of claim 1, wherein the support information is included in a high throughput (HT) capability element of the transmission frames.

4. The apparatus for transmitting data of claim 1, wherein the enable setting information is included in a HT capability element of the transmission frames.

5. The apparatus for transmitting data of claim 1, wherein the enable setting information is included in a traffic stream HT information field of a traffic specification (TSPECT) element in an add-traffic-stream (ADDTS) Request frame.

6. The apparatus for transmitting data of claim 1, wherein the multi user-power saving scheme is an automatic power save delivery (APSD) scheme, and state shifting between the sleep mode and the wake up mode of the terminals is performed according to the multi user-automatic power save delivery scheme.

7. An apparatus for receiving data in a communication system including an access point (AP) and a plurality of terminals, the apparatus comprising:
    a transmitting unit configured to transmit an uplink frame requesting buffered data to the AP by a multi user-multi-input multi-output (MIMO) scheme;
    a receiving unit configured to receive a downlink frame including buffered data corresponding to each of the terminals and support information on a multi user-power saving scheme from the AP by the multi user-MIMO scheme; and
    a control unit configured to control state shifting between a sleep mode and a wake up mode according to the multi user-power saving scheme,
    wherein the buffered data corresponding to said each of the terminals are aggregated in the downlink frame, and simultaneously transmitted to the terminals through the downlink frame, wherein the support information includes enable setting information on the terminals corresponding to the multi user-power saving scheme, wherein the enable setting information is included in transmission frames, wherein buffered frames including the buffered data are transmitted to the terminals by the multi user-MIMO scheme, wherein an end of service period (EOSP) bit and More Data bit of the downlink frame for each of the terminals are transmitted, wherein, when the number of medium access control (MAC) service data units (MSDUs) or aggregated MSDUs (A-MSDUs) transmitted to the terminals exceeds the setting of a max service period (SP) length field or there are no frames to be additionally transmitted at the time of next transmission, a service period ends, and wherein, when the downlink frames for the terminals are determined to be quality of service (QoS) null frames, the service period ends and the wake up mode is shifted to the sleep mode.

8. The apparatus for receiving data of claim 7, wherein the support information is included in a capability information field of the transmission frames.

9. The apparatus for receiving data of claim 7, wherein the support information is included in a high throughput (HT) capability element of the transmission frames.

10. The apparatus for receiving data of claim 7, wherein the enable setting information is included in a HT capability element of the transmission frames.

11. The apparatus for receiving data of claim 7, wherein the enable setting information is included in a traffic stream HT information field of a traffic specification (TSPECT) element in an add-traffic-stream (ADDTS) Request frame.

12. A method for transmitting data in a communication system including an access point (AP) and a plurality of terminals, the method comprising:

receiving an uplink frame from each of the terminals by a multi user-multiple-input multiple-output (MIMO) scheme;

generating a packet including support information on a multi user-power saving scheme controlling state shifting between a sleep mode and a wake up mode of the terminals; and simultaneously transmitting a downlink frame including the generated packet and buffered data corresponding to said each of the terminals to the terminals by the multi user-MIMO scheme, wherein the buffered data corresponding to said each of the terminals are aggregated in the downlink frame, and simultaneously transmitted to the terminals through the downlink frame, wherein the support information includes enable setting information on the terminals corresponding to the multi user-power saving scheme, wherein the enable setting information is included in transmission frames, wherein buffered frames including the buffered data are transmitted to the terminals by the multi user-MIMO scheme, wherein an end of service period (EOSP) bit and More Data bit of the downlink frame for each of the terminals are transmitted, wherein, when the number of medium access control (MAC) service data units (MSDUs) or aggregated MSDUs (A-MSDUs) transmitted to the terminals exceeds the setting of a max service period (SP) length field or there are no frames to be additionally transmitted at the time of next transmission, a service period ends, and wherein, when the downlink frames for the terminals are determined to be quality of service (QoS) null frames, the service period ends and the wake up mode is shifted to the sleep mode.

13. The method of claim 12, wherein the support information is included in a capability information field of the transmission frames.

14. The method of claim 12, wherein the support information is included in a high throughput (HT) capability element of the transmission frames.

15. The method of claim 12, wherein the enable setting information is included in a HT capability element of the transmission frames.

16. The method of claim 12, wherein the enable setting information is included in a traffic stream HT information field of a traffic specification (TSPECT) element in an add-traffic-stream (ADDTS) Request frame.

* * * * *